(No Model.)

J. W. WETMORE.
VEHICLE SPRING.

No. 291,968. Patented Jan. 15, 1884.

Witnesses
W. R. Edelen
Chas. F. Reed

Inventor
Jerome W. Wetmore

N. PETERS, Photo-Lithographer, Washington, D. C.

UNITED STATES PATENT OFFICE.

JEROME W. WETMORE, OF ERIE, PENNSYLVANIA.

VEHICLE-SPRING.

SPECIFICATION forming part of Letters Patent No. 291,968, dated January 15, 1884.

Application filed April 19, 1883. (No model.)

*To all whom it may concern:*

Be it known that I, JEROME W. WETMORE, a citizen of the United States, residing at Erie, in the county of Erie and State of Pennsylvania, have invented a new and useful Improvement in Springs, of which the following is a specification.

My invention relates to spiral torsion-springs applied over or near the axle of the vehicle.

The objects of my improvement are to have the spiral spring applied directly on the bolster and operate without friction, and constructed in such compressible form that the body containing the load may be brought near the face of the bolster when under great pressure. I attain these objects by the combination illustrated in the accompanying drawings, in which—

Figure 1:
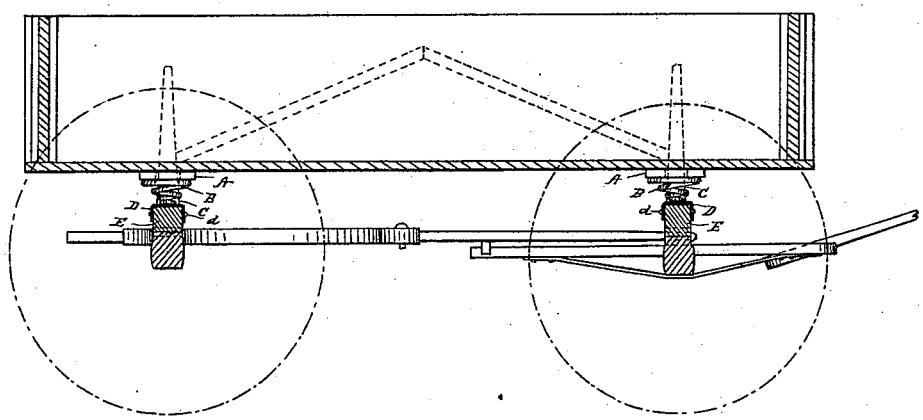
Figure 2:
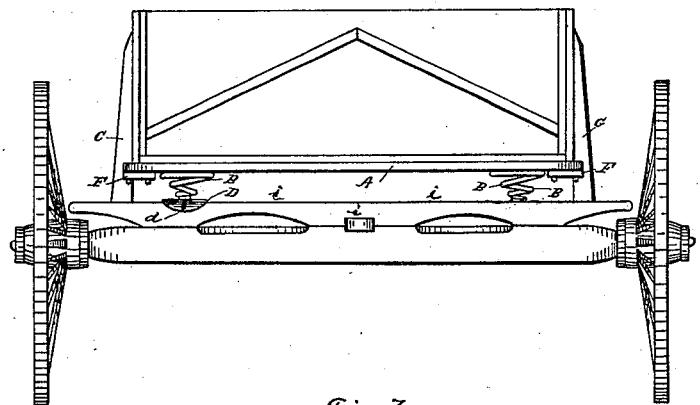
Figure 3:
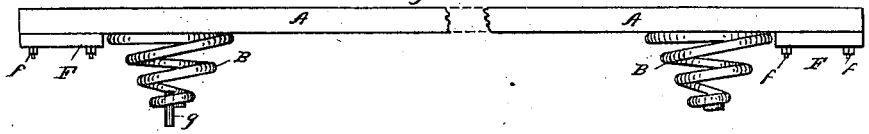
Figure 4:
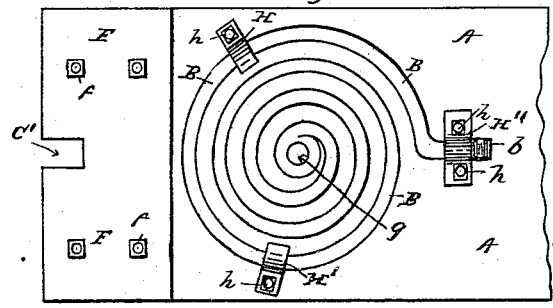

Figure 1 represents a vertical longitudinal section through the body and gears of the vehicle, exposing the side of the spring; Fig. 2, a view of the springs on the hind bolster; Fig. 3, a side view of the springs, on an enlarged scale, attached to the bolster-board; Fig. 4, a vertical view of one of the springs when the bolster-board is upside down.

A is the bolster-board; B, the spring; C, the stakes; D, plate of sheet-iron; $d$, screws to hold D, if necessary; E, the bolster; F, the cross-cleats on the ends of the bolster-boards; $f$, bolts holding the cleats to the bolster-board, their ends falling each side of the bolster, if F be pressed down onto it; $g$, a pin or bolt, which may be used if the stakes should become weak in their mortises or loose in recess C', or the bolster-board be used without stakes. Ordinarily the spring will keep its place without the pin $g$; H H', half-clips holding the base of the spring; H", a full clip holding the end $b$ of the base of the cone; $h$, clip-bolts; $i\ i\ i$, points where one or two or three similar springs may be placed.

The first ring is from six to ten inches in diameter. The spring leaves the bolster-board at H'. The number of rings in the coil depends upon the flexibility which is desired in the spring. The size of the steel depends on the load to be carried, four springs with three or four rings each of five-eighths round steel being sufficient for a load of two tons. The size of the steel will change about one thirty-second of an inch for each five hundred pounds.

The plates D are not essential until the spring has been used for some time or the load be very heavy.

The inclination of the plane of the rise of the spring is greater in the outer than the inner rings. The inner end of the spiral is not tapering. The first ring of the spring presses against cleat F.

The combination of the conical spiral spring with the bolster-board and bolster, the apex of the inverted spring resting on the bolster, (on the bolster-board if not inverted,) provides with least auxiliary appliances for an essential requisite in bolster-springs—viz., the near approach of the body holding the load to the face of the bolster when the load is heavy and the strain on the springs severe. If the shock be excessive, the cleats will relieve the springs by resting on the bolster.

When the plate D and pin $g$ are desirable, they may be used, or the pin may be replaced by a fixed projection from the middle of the plate.

What I claim, and desire to secure by Letters Patent, is—

The improvement in bolster-springs, consisting of a combination of the cross piece or plate A, the guide-slots C', the supporting-cleats F, and the inverted steel spiral springs B, the apices of the latter resting on the upper face of the bolster or bolster-plates, the whole detachable and readily removable, substantially as described.

JEROME W. WETMORE.

Witnesses:
CRAIG J. REID,
WM. P. HAYES.